P. W. MACKENZIE.
Cupola Furnace.
No. 1,403. Reissued Feb. 10, 1863.
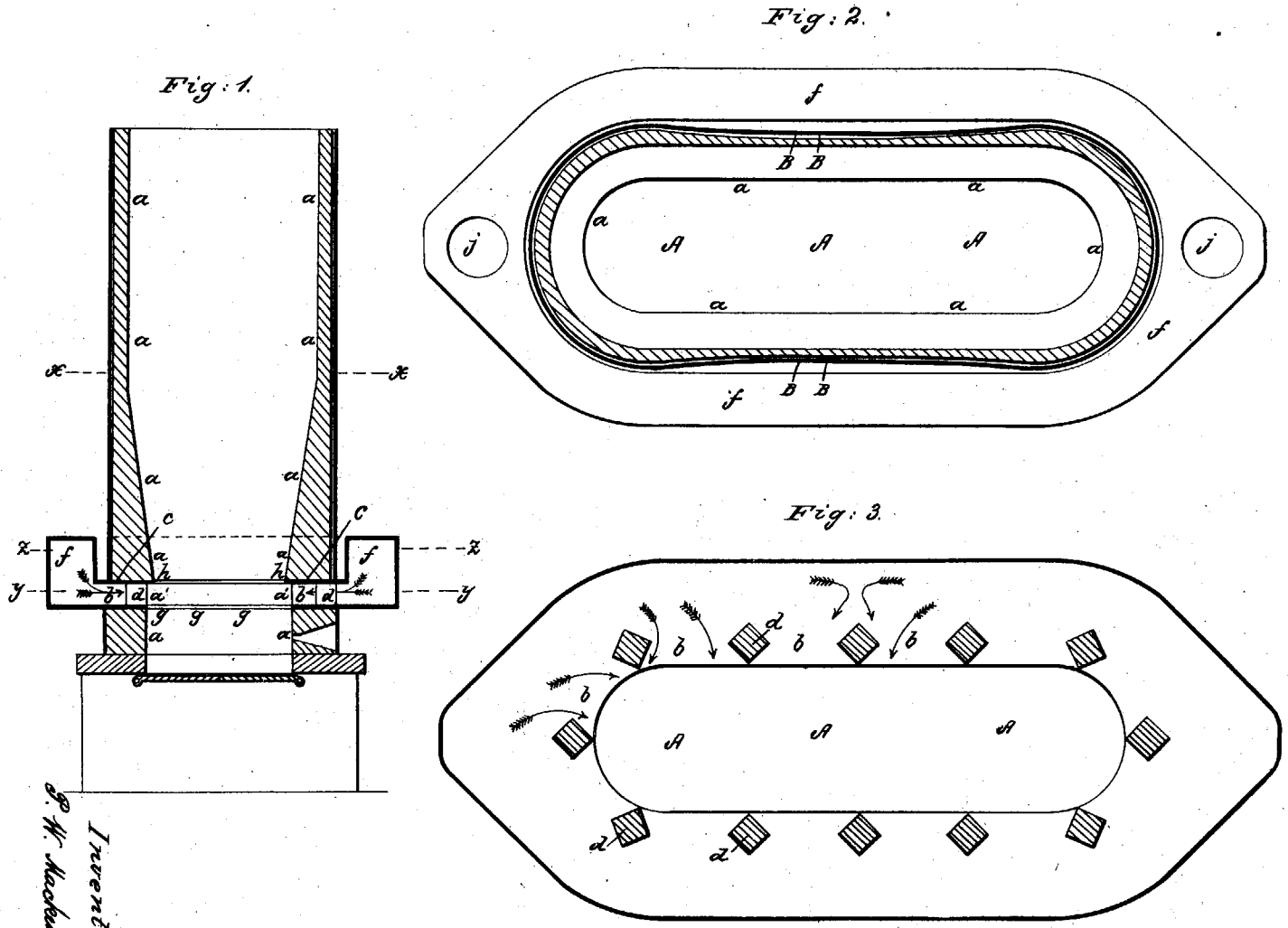
N. PETERS, Photo-Lithographer, Washington, D. C.

UNITED STATES PATENT OFFICE.

PHILIP W. MACKENZIE, OF NEW YORK, N. Y., ASSIGNOR, BY MESNE ASSIGNMENTS, TO ADDISON SMITH AND JAMES M. SAYRE.

IMPROVEMENT IN CUPOLA AND OTHER FURNACES.

Specification forming part of Letters Patent No. 18,051, dated August 25, 1857; Reissue No. 1,403, dated February 10, 1863.

*To all whom it may concern:*

Be it known that I, PHILIP W. MACKENZIE, of Jersey City, in the county of Hudson and State of New Jersey, have invented certain new and useful Improvements in Cupola Furnaces for Melting Iron, and also for Blast Furnaces; and I do hereby declare the following to be a full, clear, and exact description thereof, reference being had to the accompanying drawings, figures, and letters of reference thereon, making part of this specification.

Of the said drawings, Figure 1 shows a vertical transverse section of my cupola. Fig. 2 is a horizontal section taken through the lines *z z* of Fig. 1. Fig. 3 is a horizontal section taken through the lines *y y*, Fig. 1.

Similar letters of reference indicate like parts in all the drawings.

In the ordinary cupolas much trouble and difficulty arise from the shells frequently bursting open by the expansion of the brick-work; to obviate which I concave the sides of the cupola, as shown at B B, Fig. 2, so that as the bricks expand the shell is drawn from the brick-work at that point, thereby relieving the strain until the shell has become heated and expanded also.

The second part of my invention consists in arranging a continuous air-chamber in combination with a cupola and opening for the introduction of a continuous sheet of air to the fuel.

The third part of my invention consists in enlarging that part below the tuyere in combination with a cupola provided with a continuous air-chamber, whereby I am enabled to increase the capacity of the cupola and obtain perfect circulation of air to the fuel.

To enable others skilled in the art to make and use my invention, I will describe the construction and operation thereof.

A A A in Figs. 1 and 2 represent the elongated form of the cupola, and *a a a* show the inner face of the brick-work, which may be straight or curved, as may be desired.

*b b b* in Figs. 1 and 3, represent the mode of entering the blast or continuous sheet of air, as indicated by the arrows. The tuyere-plate *c c*, which forms the top of the tuyere, being removed, the short columns *d d* of fire-brick or other suitable substance, support the tuyere-plate and the brick-work thereon, but are placed, as indicated, back from the inner face of brick-work, so as not to obstruct the blast where it enters the fuel at *a′ a′*—the blast entering the air-chamber at *i′ i′*, passing along the continuous chamber *f f*, and between the columns *d d* to the fuel, as indicated by the arrows.

In Fig. 1, G G represents the cupola as being enlarged below the upper part of the tuyere *h h*, thereby increasing its capacity at that point and in a great measure reduces the pressure at the tuyere, facilitating the blast in getting under the fuel and reaching the center.

Fig. 2 represents my method of constructing shells of cupola. As they are frequently bursting open by the expansion of the brick-work, to obviate which I concave portions of it, as shown at B B, so that as the brick expand the shell is drawn from the brick-work at that point, thereby relieving the strain until the shell has become heated and expanded also.

My improved cupola reduces the quantity of fuel compared with ordinary cupolas in use from twenty to forty per cent., melting much faster and making hotter iron. These conclusions result from practical and costly experiments, demonstrating that the ordinary cupolas do not meet in proportion to the area of their bottoms, but in proportion to their circumference, but the necessary fuel is in proportion to the area of bottom.

The continuous air-chamber and increased size at *g g* insures thorough penetration to the centre, thereby making every inch of area active melting-surface, and is managed and operated the same as an ordinary cupola.

It will be obvious that the features of invention herein recited as the second and third may be readily applied to any form of cupola, whether round, elliptical, or elongated, and the invention will be the same.

I claim as my invention—

1. A cupola of elongated form, in combination with curved sides, substantially as described, and for the purposes set forth.

2. The arrangement of a continuous air-chamber, in combination with a cupola and opening for the introduction of a continuous sheet of air to the fuel, substantially as described, and for the purposes set forth.

3. In combination with a cupola provided with a continuous air-chamber, substantially as described, enlarging that part below the tuyere, whereby the capacity of the cupola is increased and perfect circulation of air to the fuel obtained, substantially as described and specified.

P. W. MACKENZIE.

Witnesses:
C. A. DURGIN,
W. WRAY.